(12) United States Patent
Zhang et al.

(10) Patent No.: US 12,511,506 B2
(45) Date of Patent: Dec. 30, 2025

(54) METHOD AND ELECTRONIC DEVICE WITH VISUAL CODE PROCESSING

(71) Applicant: Samsung Electronics Co., Ltd., Suwon-si (KR)

(72) Inventors: YunHao Zhang, Xi'an (CN); Ronghua Kang, Xi'an (CN); Seungin Park, Suwon-si (KR); Byung In Yoo, Suwon-si (KR); Ying Min, Xi'an (CN); Zhijie Lv, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/614,154

(22) Filed: Mar. 22, 2024

(65) Prior Publication Data

US 2024/0320454 A1     Sep. 26, 2024

(30) Foreign Application Priority Data

Mar. 22, 2023   (CN) .......................... 202310286897.8
Mar. 8, 2024    (KR) .......................... 10-2024-0033198

(51) Int. Cl.
*G06K 9/80*     (2006.01)
*G06K 7/14*     (2006.01)

(52) U.S. Cl.
CPC ......... *G06K 7/1417* (2013.01); *G06K 7/1413* (2013.01)

(58) Field of Classification Search
CPC ......... G06K 7/1417; G06K 2207/1017; G06K 19/06037; G06K 7/1413; G06K 7/1491; G06K 19/06028; G06K 7/1404

USPC ......................................... 235/462.1, 462.09
See application file for complete search history.

(56) References Cited

U.S. PATENT DOCUMENTS

| | | | | |
|---|---|---|---|---|
| 5,932,862 A | * | 8/1999 | Hussey ............ | G06K 19/06037 235/462.07 |
| 11,381,743 B1 | | 7/2022 | Mahbub et al. | |
| 11,449,857 B2 | | 9/2022 | Han | |
| 11,451,445 B2 | | 9/2022 | Davito | |
| 2005/0103868 A1 | * | 5/2005 | Zhu ..................... | G06K 7/10732 235/462.46 |
| 2005/0242189 A1 | * | 11/2005 | Rohs .................. | H04N 1/32133 235/462.46 |
| 2005/0286741 A1 | * | 12/2005 | Watanabe ............. | H04N 19/63 375/E7.134 |

(Continued)

FOREIGN PATENT DOCUMENTS

| | | |
|---|---|---|
| CN | 102982302 A | 3/2013 |
| CN | 103488528 A | 1/2014 |

(Continued)

*Primary Examiner* — Daniel St Cyr
(74) *Attorney, Agent, or Firm* — NSIP Law

(57) ABSTRACT

A processor-implemented method with visual code processing includes generating a first image by capturing a first visual code, using an always on (AO) sensor module of an electronic device, detecting a first code image included in the first image and corresponding to the first visual code, using the AO sensor module, performing a first type decoding on the first code image, using the AO sensor module, waking up an application processor (AP) of the electronic device from a low-power state, based on a first decoding result of the first type decoding, and executing a first application of the electronic device corresponding to the first visual code, using the AP.

18 Claims, 4 Drawing Sheets

(56) References Cited

U.S. PATENT DOCUMENTS

| | | | | |
|---|---|---|---|---|
| 2006/0208083 A1* | 9/2006 | Kotlarsky | ................ | G06K 7/14 |
| | | | | 235/462.01 |
| 2022/0262089 A1* | 8/2022 | Ma | ...................... | G06V 10/245 |
| 2023/0325620 A1* | 10/2023 | Faaborg | ............. | G06Q 20/3276 |
| | | | | 235/462.01 |

FOREIGN PATENT DOCUMENTS

| | | | | | |
|---|---|---|---|---|---|
| CN | 105046186 A | | 11/2015 | | |
| CN | 114079738 | * | 2/2022 | .......... | H04N 23/665 |
| KR | 10-2022-0022439 A | | 2/2022 | | |

* cited by examiner

METHOD AND ELECTRONIC DEVICE WITH VISUAL CODE PROCESSING

CROSS-REFERENCE TO RELATED APPLICATIONS

This application claims the benefit under 35 USC § 119(a) of Chinese Patent Application No. 202310286897.8 filed on Mar. 22, 2023 in the China National Intellectual Property Administration, and Korean Patent Application No. 10-2024-0033198 filed on Mar. 8, 2024 in the Korean Intellectual Property Office, the entire disclosures of which are incorporated herein by reference for all purposes.

BACKGROUND

1. Field

The following description relates to a method and electronic device with visual code processing.

2. Description of Related Art

Applications may use visual codes (e.g., barcodes, quick-response (QR) codes, etc.) and visual code-related functions may be added to applications. To recognize a visual code and enter a visual code-related scene (e.g., a payment scene) using an electronic device (e.g., an electronic terminal), a user may need to recognize a visual code using a function of unlocking the electronic device, executing a corresponding application, and scanning the corresponding application. Such a series of manual tasks of the user may require unnecessary time and energy and may degrade a user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method with visual code processing includes: generating a first image by capturing a first visual code, using an always on (AO) sensor module of an electronic device; detecting a first code image included in the first image and corresponding to the first visual code, using the AO sensor module; performing a first type decoding on the first code image, using the AO sensor module; waking up an application processor (AP) of the electronic device from a low-power state, based on a first decoding result of the first type decoding; and executing a first application of the electronic device corresponding to the first visual code, using the AP.

The method may include: generating a second decoding result by performing a second type decoding based on the first decoding result; and displaying the second decoding result using the first application.

The method may include: unlocking the electronic device based on the first decoding result, wherein the executing of the first application, the generating of the second decoding result, and the unlocking of the electronic device are performed in parallel.

The first decoding result may include task information related to the first application, and the generating of the second decoding result may include: transmitting the task information to a service server of the first application; and receiving additional task information related to the first application as the second decoding result from the service server.

The method may include: in response to the first type decoding of the first code image failing, generate a second image, generating a second image by capturing the first visual code at a resolution greater than a resolution of the first image, using the AO sensor module, detecting a second code image included in the second image and corresponding to the first visual code, using the AO sensor module, and performing the first type decoding on the second code image, using the AO sensor module; and in response to the first type decoding of the second code image succeeding, waking up the AP from the low-power state based on a decoding result of the first type decoding of the second code image, and executing the first application using the AP.

The method may include, in response to the first type decoding of the second code image failing, generating a third image by capturing the first visual code at a same resolution as the resolution of the first image, using the AO sensor module.

The method may include determining whether the first application is installed in the electronic device, based on the first decoding result, using the AO sensor module.

The first decoding result may include a first identifier of the first application, and the determining of whether the first application is installed in the electronic device may include comparing the first identifier to an application list of the electronic device and determining whether the first application is installed in the electronic device.

The method may include, in response to a determination that the first application is not installed in the electronic device, capturing the first visual code or another visual code, using the AO sensor module.

In one or more general aspects, a non-transitory computer-readable storage medium may store instructions that, when executed by one or more processors, configure the one or more processors to perform any one, any combination, or all of operations and/or methods disclosed herein.

In one or more general aspects, an electronic device includes: an always on (AO) sensor module configured to generate a first image by capturing a first visual code, detect a first code image included in the first image and corresponding to the first visual code, and perform a first type decoding on the first code image; and an application processor (AP) that wakes up from a low-power state based on a first decoding result of the first type decoding and that is configured to execute a first application of the electronic device corresponding to the first visual code.

The AP may be configured to: generate a second decoding result by performing a second type decoding based on the first decoding result; and display the second decoding result using the first application.

The AP may be configured to unlock the electronic device based on the first decoding result, and executing of the first application, generating of the second decoding result, and unlocking of the electronic device may be performed in parallel.

The first decoding result may include task information related to the first application, and for the generating of the second decoding result, the AP may be configured to transmit the task information to a service server of the first application and receive additional task information related to the first application as the second decoding result from the service server.

In response to the first type decoding of the first code image failing, the AO sensor module may be configured to generate a second image by capturing the first visual code at a resolution greater than a resolution of the first image, detect a second code image included in the second image and corresponding to the first visual code, and perform the first type decoding on the second code image, in response to the first type decoding of the second code image succeeding, the AO sensor module may be configured to wake up the AP from the low-power state based on a decoding result of the first type decoding of the second code image, and in response to the first type decoding of the second code image succeeding, the AP may wake up from the low-power state and may be configured to execute the first application.

In response to the first type decoding of the second code image failing, the AO sensor module may be configured to generate a third image by capturing the first visual code at a same resolution as the resolution of the first image.

The AO sensor module may be configured to determine whether the first application is installed in the electronic device, based on the first decoding result.

The first decoding result may include a first identifier of the first application, and for the determining of whether the first application is installed in the electronic device, the AO sensor module may be configured to compare the first identifier to an application list of the electronic device and determine whether the first application is installed in the electronic device.

In response to a determination that the first application is not installed in the electronic device, the AO sensor module may be configured to capture the first visual code or another visual code.

In one or more general aspects, an electronic device includes: an always on (AO) sensor module configured to perform: a decoding based on a first image capturing a first visual code; and another decoding based on a second image capturing the first visual code at a greater resolution than the first image, in response to determining a first code image is not recognized based on the decoding; and an application processor (AP) configured to be woken up from a low-power state and execute a first application of the electronic device corresponding to the first visual code using the AP, based on either a result of the decoding, or a result of the other decoding in response to the other decoding being performed.

Other features and aspects will be apparent from the following detailed description, the drawings, and the claims.

Figure 1:
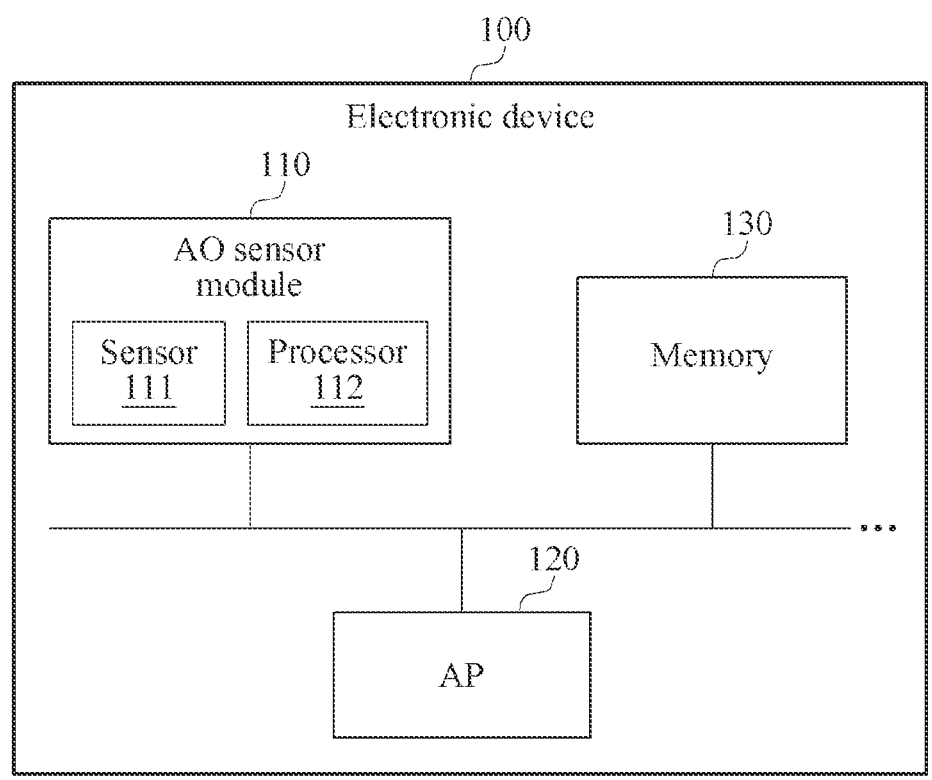
FIG. 1 is a block diagram illustrating an example of a configuration of an electronic device.

Throughout the drawings and the detailed description, unless otherwise described or provided, it may be understood that the same drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Hereinafter, the examples will be described in detail with reference to the accompanying drawings. When describing the examples with reference to the accompanying drawings, like reference numerals refer to like elements and a repeated description related thereto will be omitted.

FIG. 1 is a block diagram illustrating an example of a configuration of an electronic device. Referring to FIG. 1, an electronic device 100 includes an always on (AO) sensor module 110, an application processor (AP) 120 (e.g., one or more processors), and a memory 130 (e.g., one or more memories). Although not shown in FIG. 1, the electronic device 100 may further include a storage, an input device, an output device, a network interface, and the like. For example, the electronic device 100 may be implemented as a portion of a mobile device, such as a mobile phone, a smartphone, a personal digital assistant (PDA), a netbook, a tablet computer, a laptop computer, and the like, a wearable device, such as a smartwatch, a smart band, smart glasses, and the like, a computing device, such as a desktop, a server, and the like, home appliances, such as a television (TV), a smart TV, a refrigerator, and the like, a security device, such as a door lock, and the like, and a vehicle, such as an autonomous vehicle, a smart vehicle, and the like. The AP 120 may be or include a system on a chip (SoC), a microprocessor, and/or the like, but examples are not limited thereto. The memory 130 may include a non-transitory computer-readable storage medium storing instructions that, when executed by the AP 120, configure the AP 120 to perform any one, any combination, or all of operations and/or methods of the AP 120 disclosed herein with reference to FIGS. 1-4.

The AO sensor module 110 may be configured to consume a small amount of power, and may continue to operate in a low-power state when the electronic device 100 is powered on. The AO sensor module 110 may operate in response to a command of an operating system (OS). The AO sensor module 110 may include a sensor 111 (e.g., one or more cameras). When the AP 120 is in a low-power state (e.g., a sleep state) and when the electronic device 100 is in a locked state, the AO sensor module 110 may consecutively capture (e.g., using the sensor 111) images at a low resolution and may detect a presence of a code image corresponding to a visual code (e.g., a barcode, and a quick-response (QR) code) among the captured images. For example, the visual code may have the same format as those of a barcode and a QR code, and may include product information, product order information, and the like. However, the visual code is merely an example, and examples are not limited thereto. A capturing resolution may change as needed.

The AO sensor module 110 may include the sensor 111 configured to capture images, and a processor 112 (e.g., a microcontroller and/or a micro controller unit (MCU)). The processor 112 may be distinguished from the AP 120. The processor 112 of the AO sensor module 110 may process operations of the AO sensor module 110, for example, an operation of detecting a code image from an image, and an operation of performing first type decoding on the code image. The processor 112 of the AO sensor module 110 may automatically process operations of the AO sensor module 110 even when the AP 120 is in the low-power state, instead of waking up the AP 120.

In an example, when the AO sensor module 110 detects a first code image corresponding to a first visual code from the first image, the AO sensor module 110 may perform first type decoding on the first code image, and may obtain, as a decoding result of the first type decoding, a first identifier indicating a first application (e.g., a chat application and/or a messaging application) corresponding to the first visual code, and task information (e.g., payment information) related to the first application. When the first type decoding succeeds in the AO sensor module 110, the AO sensor module 110 may transmit the decoding result of the first type decoding to the AP 120.

In an example, the AO sensor module 110 may determine whether the first application corresponding to the first visual code is installed in the electronic device 100, based on the decoding result of the first type decoding. For example, the AO sensor module 110 may determine whether the first application is installed in the electronic device 100, based on the first identifier included in the decoding result of the first type decoding. When the first application corresponding to the first visual code is not installed in the electronic device 100, the AO sensor module 110 may continue to capture images at a first resolution.

When the first type decoding of the first code image in the first image fails in the AO sensor module 110, the AO sensor module 110 may generate a second image by capturing the first visual code at a resolution greater than a resolution of the first image. For example, when the resolution of the first image is not high enough to recognize the first code image, the AO sensor module 110 may fail to perform the first type decoding on the first code image in the first image (or determine that the first type decoding on the first code image has failed). For example, the resolution of the first image may be a first resolution, and a resolution of the second image may be a second resolution greater than the first resolution. The AO sensor module 110 may detect a second code image corresponding to the first visual code from the second image and perform the first type decoding on the second code image.

In an example, a low-resolution image may be preferentially obtained. The sensor module 110 may obtain (e.g., generate) a high-resolution image only when the sensor module 110 fails to obtain (e.g., determine) decoding information from a low-resolution image. Accordingly, the electronic device 100 of one or more embodiments may reduce an amount of power to be consumed to capture an image.

When the first type decoding of the second code image fails in the AO sensor module 110, the AO sensor module 110 may generate a third image by capturing the first visual code at the same resolution (e.g., the first resolution) as that of the first image. For example, when the second code image is unclear due to hand shaking of a user, etc., the first type decoding of the second code image may fail.

In an example, the AP 120 may wake up from the low-power state and enter an operation state, by receiving the decoding result of the first type decoding from the AO sensor module 110. The AP 120 may minimize power consumption by not processing a task in the low-power state but processing a task in the operation state. To process a task in the AP 120, the AP 120 may wake up from the low-power state and enter the operation state.

For example, in response to receiving the decoding result of the first type decoding from the AO sensor module 110, the AP 120 may unlock the electronic device 100, may execute the first application based on the decoding result of the first type decoding, may perform second type decoding based on the decoding result of the first type decoding, may generate a decoding result of the second type decoding, and may display the decoding result of the second type decoding using the first application. An executing of an application may correspond to operating of an application, triggering of an application, and the like. The decoding result of the first type decoding may also be referred to as a "first decoding result," and the decoding result of the second type decoding may also be referred to as a "second decoding result."

The AP 120 may wake up from the low-power state based on the first decoding result. The electronic device 100 may be unlocked based on the first decoding result.

In an example, although not shown in FIG. 1, the electronic device 100 may include an unlocking module. The unlocking module may be included in the AP 120 or may be outside the AP 120. In response to receiving the first decoding result, the AP 120 may transmit an unlock command to unlock the electronic device 100 to the unlocking module. In response to receiving the unlock command, the unlocking module may obtain unlocking information. The unlocking module may unlock the electronic device 100, based on the unlocking information. For example, the unlocking information may include query information for unlocking (e.g. a fingerprint, a face image, and an iris image). For example, the unlocking information may include query information (e.g., a face image, and an iris image) that may be obtained instead of requiring an intentional action of a user. For example, the unlocking module may capture a face image or an iris image and unlock the electronic device 100 based on the face image or the iris image.

The AP 120 may execute an application indicated by an identifier included in the first decoding result, in response to receiving the first decoding result from the AO sensor module 110. For example, the AP 120 may execute the first application indicated by the first identifier.

The AP 120 may obtain a second decoding result by performing second type decoding based on the first decoding result, in response to receiving the first decoding result from the AO sensor module 110. For example, the AP 120 may obtain task information included in the first decoding result, may transmit the task information to a service server of the first application indicated by the first identifier included in the first decoding result, and may receive additional task information related to the first application as the second decoding result from the service server. For example, the task information may be encrypted task information, and the additional task information may be task information generated from a decryption result of the encrypted task information. The electronic device 100 may perform a corresponding task (e.g., a payment) based on the additional task information.

In an example, the AP 120 may perform, in parallel, an operation of executing the first application based on the first decoding result, an operation of generating the second decoding result by performing the second type decoding, and an operation of unlocking the electronic device 100.

Based on a visual code processing method of the electronic device 100 of one or more embodiments, a period from a recognition of a visual code to an entry of a scene related to the visual code may be reduced. In addition, when the electronic device 100 is in the locked state and when the AP 120 is in the sleep state, a low-resolution image may be captured using the AO sensor module 110, and thus, the electronic device 100 of one or more embodiments may reduce an amount of power to be consumed to recognize a visual code. Furthermore, executing of the first application, performing of the second type decoding, and unlocking of the electronic device 100 may be performed in parallel, and accordingly, the electronic device 100 of one or more embodiments may reduce an amount of time to derive a task result related to the visual code and may enhance a user experience.

In an example, an identifier and task information of an application may be obtained by performing the first type decoding using the AO sensor module 110. A decoding task of the AO sensor module 110 may quickly derive a decoding result in comparison to a decoding task of the AP 120 performed when the electronic device 100 is unlocked and when the AP 120 is activated, and thus the electronic device 100 of one or more embodiments may reduce an amount of power to be consumed to recognize a visual code of the electronic device 100. The first decoding result may be used to obtain task information in the AP 120, and accordingly, an application corresponding to visual information may not need to be used to obtain task information. Thus, executing of the first application, performing of the second type decoding, and unlocking of the electronic device 100 of one or more embodiments may be performed in parallel, and a waiting time of a user may be reduced.

Figure 2:
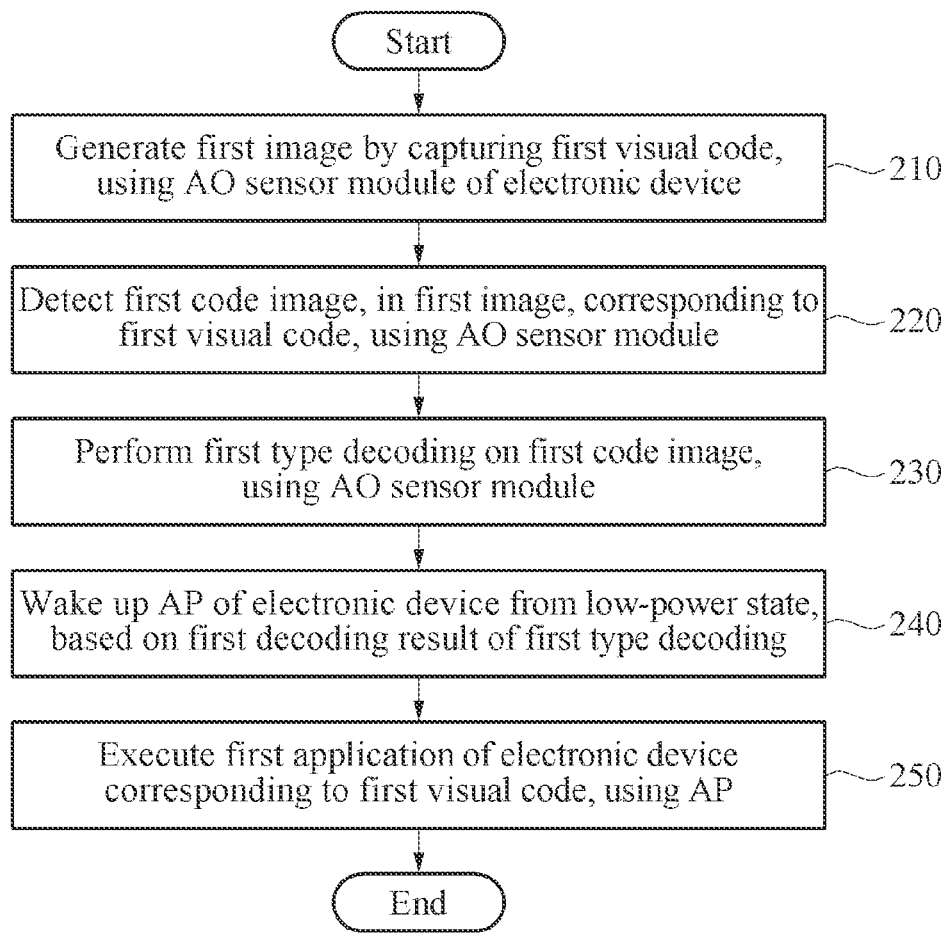
FIG. 2 is a flowchart illustrating an example of a method of processing a visual code.

FIG. 2 is a flowchart illustrating an example of a method of processing a visual code. Operations 210 to 250 described below may be performed in the order and manner as shown and described below with reference to FIG. 2, but the order of one or more of the operations may be changed, one or more of the operations may be omitted, and/or two or more of the operations may be performed in parallel or simultaneously without departing from the spirit and scope of the example embodiments described herein.

Referring to FIG. 2, in operation 210, an electronic device may generate a first image by capturing a first visual code, using an AO sensor module of the electronic device. Even when the electronic device is in the locked state and an AP is in the low-power state, the AO sensor module may generate the first image by capturing the first visual code.

In operation 220, the electronic device may detect a first code image, in the first image, corresponding to the first visual code, using the AO sensor module. When the first image includes the first code image, the first code image may correspond to at least a partial area of the first image. The AO sensor module may detect the first code image from the first image even when the electronic device is in the locked state and the AP is in the low-power state.

In operation 230, the electronic device may perform first type decoding on the first code image, using the AO sensor module. The AO sensor module may obtain a first decoding result according to the first type decoding. For example, the first decoding result may include an identifier of a first application corresponding to the first visual code and task information related to the first application. The AO sensor module may be used to perform the first type decoding on the first code image, even when the electronic device is in the locked state and the AP is in the low-power state.

In operation 240, the electronic device may wake up the AP of the electronic device from the low-power state, based on the first decoding result of the first type decoding. The AO sensor module may wake up the AP based on the first decoding result. The AO sensor module may have a function or authority to wake up the AP. For example, the AO sensor module may transmit the first decoding result to the AP, and the AP may wake up based on the first decoding result.

The AO sensor module may determine whether the first application is installed in the electronic device, based on the first decoding result. The first decoding result may include a first identifier of the first application. The AO sensor module may include an application list of the electronic device. The AO sensor module may compare the first identifier to the application list of the electronic device and determine whether the first application is installed in the electronic device.

When it is determined that the first application is not installed in the electronic device, the AO sensor module may or may not wake up the AP. In an example, the AO sensor module may wake up the AP, and the AP may install the first application in the electronic device. In another example, the AO sensor module may continue to capture the first visual code or another visual code, instead of waking up the AP.

In response to receiving the first decoding result from the AO sensor module, the AP may transmit an unlock command to unlock the electronic device to an unlocking module of the electronic device. In response to receiving the unlock command, the unlocking module may obtain unlocking information. The unlocking module may unlock the electronic device, based on the unlocking information.

For example, the unlocking information may include query information for unlocking (e.g. a fingerprint, a face image, and an iris image). For example, the unlocking information may include query information (e.g., a face image, and an iris image) that may be obtained instead of requiring an intentional action of a user. For example, the unlocking module may capture a face image or an iris image and unlock the electronic device based on the face image or the iris image. For example, a capturing direction of the AO sensor module may be opposite to a capturing direction of the unlocking module. In an example, the unlocking module may capture a user direction, and the AO sensor module may capture a direction a user is viewing. In this example, since an intentional action of the user is not required to obtain query information, a user experience may be enhanced.

In operation 250, the electronic device may execute the first application of the electronic device corresponding to the first visual code, using the AP. The first application may display a task result based on task information of the first visual code.

The AP may generate a second decoding result by performing second type decoding based on the first decoding result, and may display the second decoding result using the first application. For example, the first decoding result may include task information related to the first application, and the AP may transmit the task information of the first decoding result to a service server of the first application, and may receive additional task information related to the first application as the second decoding result from the service server. For example, the task information of the first decoding result may be encrypted task information, and the additional task information as the second decoding result may be task information generated from a decryption result of the encrypted task information.

The first type decoding may be performed by the AO sensor module, and the second type decoding may be performed by the AP and/or the service server. The second type decoding may be performed based on the first type decoding. The second type decoding may be relatively complex and may require a large number of resources, in comparison to the first type decoding. For example, the first type decoding may include an operation of extracting information from a visual code, and the second type decoding may include a decoding operation, an operation of additionally processing extracted information, and the like.

The electronic device (e.g., the AP) may unlock the electronic device, based on the first decoding result. In operation 250, an operation of generating the second decoding result and an operation of unlocking the electronic device may be performed in parallel.

When the first type decoding of the first code image fails, the electronic device may generate a second image by capturing the first visual code at a resolution greater than a resolution of the first image, using the AO sensor module, may detect a second code image, in the second image, corresponding to the first visual code, using the AO sensor module, and may perform first type decoding on the second code image, using the AO sensor module. For example, the resolution of the first image may be a first resolution, and a resolution of the second image may be a second resolution greater than the first resolution.

When the first type decoding of the second code image succeeds, the electronic device may wake up the AP from the low-power state based on a decoding result of the first type decoding of the second code image, and may execute the first application using the AP. The decoding result obtained by the AO sensor module in response to a success in the first type decoding of the first code image may be identical to the decoding result obtained by the AO sensor module in response to a success in the first type decoding of the second code image. When the first type decoding of the second code image fails, the electronic device may generate a third image by capturing the first visual code at the same resolution (e.g., the first resolution) as that of the first image, using the AO sensor module.

Figure 3:
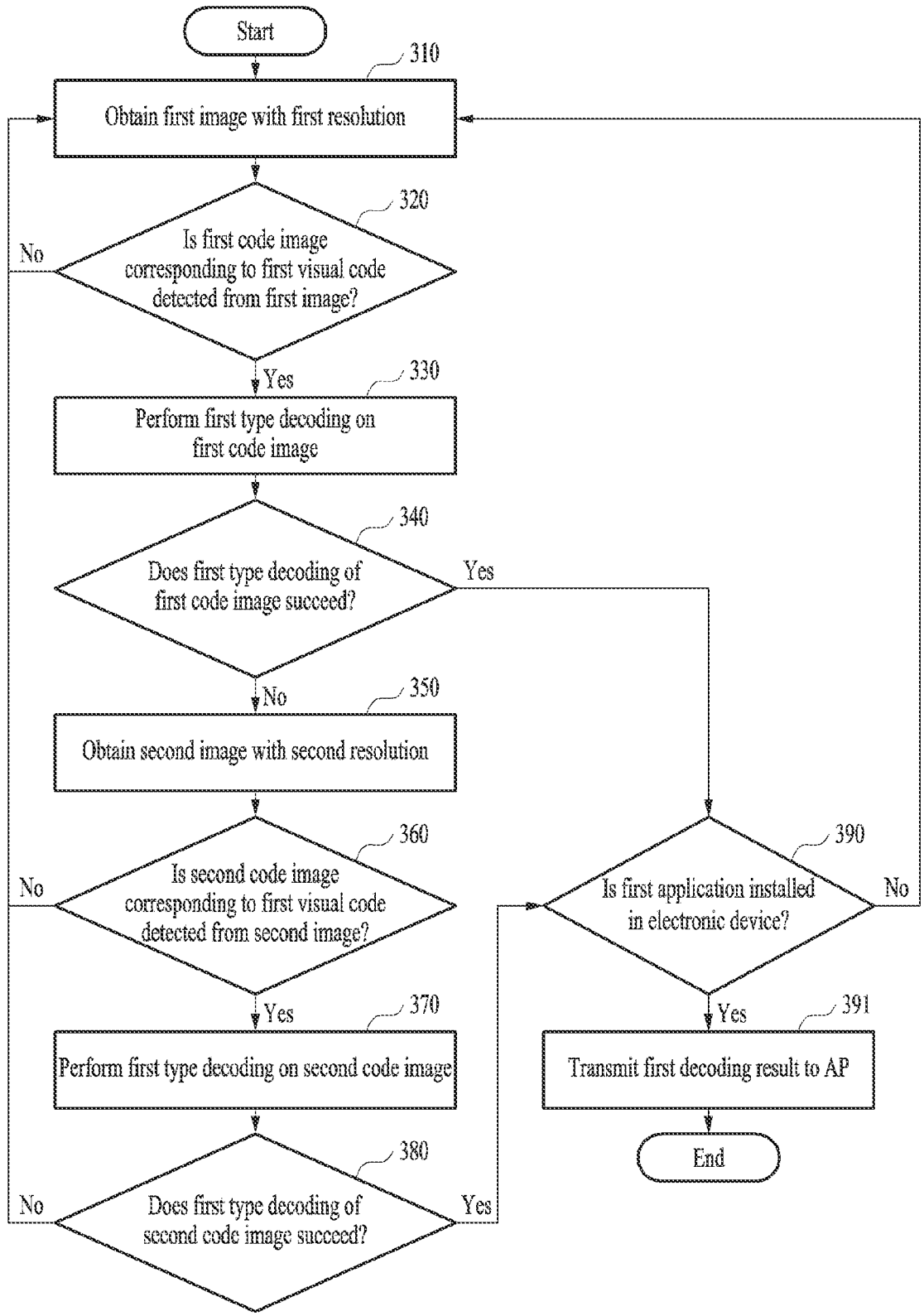
FIG. 3 is a flowchart illustrating an example of a method of operating an always on (AO) sensor module.

FIG. 3 is a flowchart illustrating an example of a method of operating an AO sensor module. Operations 310 to 391 described below may be performed in the order and manner as shown and described below with reference to FIG. 3, but the order of one or more of the operations may be changed, one or more of the operations may be omitted, and/or two or more of the operations may be performed in parallel or simultaneously without departing from the spirit and scope of the example embodiments described herein.

Referring to FIG. 3, in operation 310, the AO sensor module may obtain a first image with a first resolution. When an AP is in the sleep state and/or when an electronic device is in the locked state, the AO sensor module may obtain the first image with the first resolution.

In operation 320, the AO sensor module (e.g., a processor of the AO sensor module) may determine whether a first code image corresponding to a first visual code is detected from the first image. When the AO sensor module fails to detect the first code image from the first image, the AO sensor module may revert to operation 310.

When the AO sensor module detects the first code image from the first image, the AO sensor module (e.g., the processor of the AO sensor module) may perform first type decoding on the first code image in operation 330. The AO sensor module may perform the first type decoding on the first code image and may obtain, as a first decoding result of the first type decoding, a first identifier of a first application corresponding to the first visual code and/or task information related to the first application. The first identifier and/or the task information may be obtained as an encrypted identifier and/or encrypted task information.

In operation 340, the AO sensor module may determine whether the first type decoding of the first code image succeeds. When the first type decoding succeeds, the AO sensor module may determine whether the first application is installed in the electronic device in operation 390. For example, the AO sensor module may determine, based on the first identifier of the first decoding result, whether the first application is installed in the electronic device.

When the first type decoding fails, the AO sensor module may obtain a second image with a second resolution in operation 350. For example, when the first resolution of the first image is extremely low, the first type decoding may fail. The second resolution may be greater than the first resolution.

In operation 360, the AO sensor module may determine whether a second code image corresponding to the first visual code is detected from the second image. When the AO sensor module fails to detect the second code image from the second image, the AO sensor module may revert to operation 310.

When the AO sensor module detects the second code image from the second image, the AO sensor module may perform first type decoding on the second code image in operation 370. The AO sensor module may perform the first type decoding on the second code image and may obtain, as a first decoding result of the first type decoding, the first identifier of the first application corresponding to the first visual code and/or the task information related to the first application.

In operation 380, the AO sensor module may determine whether the first type decoding of the second code image succeeds. When the first type decoding succeeds, the AO sensor module may determine whether the first application is installed in the electronic device in operation 390. For example, the AO sensor module may determine, based on the first identifier of the first decoding result, whether the first application is installed in the electronic device.

When the first type decoding fails, the AO sensor module may revert to operation 310. For example, it may be difficult to recognize an image due to hand shaking of a user, which may lead to a failure in the first type decoding.

When it is determined that the first application is not installed in the electronic device in operation 390, the AO sensor module may revert to operation 310.

When it is determined that the first application is installed in the electronic device, the AO sensor module may transmit the first decoding result to the AP in operation 391.

In a visual code recognition method according to examples, images may continue to be captured at a low resolution using the AO sensor module in the sleep state of the AP and/or the locked state of the electronic device, and detecting of a code image and decoding may be performed using the processor of the AO sensor module. In comparison to an existing method of recognizing a visual code in an operation state of an AP and/or an unlocked state of an electronic device, an amount of time to wake up the AP and unlock the electronic device to recognize a visual code may not be necessary and an amount of power to be consumed to monitor a visual code may be reduced using the visual code recognition method according to examples.

Figure 4:
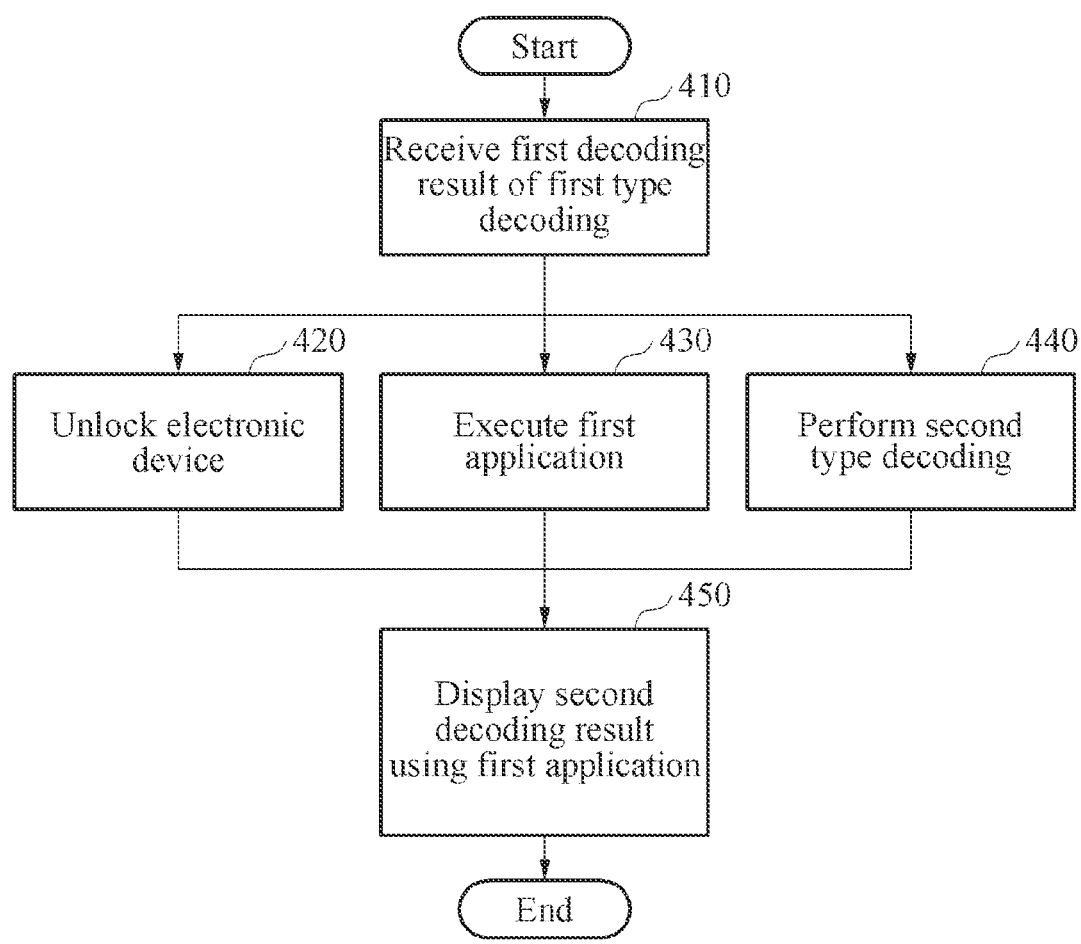
FIG. 4 is a flowchart illustrating an example of a method of operating an application processor (AP).

FIG. 4 is a flowchart illustrating an example of a method of operating an AP. Referring to FIG. 4, in operation 410, the AP may receive a first decoding result of first type decoding. For example, in response to receiving the first decoding result, the AP may transition from a low-power state to an operation state.

In operation 420, the AP may unlock an electronic device, in response to receiving the first decoding result. For example, the AP may transmit an unlock command to an unlocking module, in response to receiving the first decoding result. The unlocking module may obtain unlocking information based on the unlock command and unlock the electronic device based on the unlocking information.

In operation 430, the AP may execute a first application, in response to receiving the first decoding result. The AP may execute a first application indicated by a first identifier included in the first decoding result, based on the first identifier.

In operation 440, the AP may perform second type decoding, in response to receiving the first decoding result. The AP may perform the second type decoding based on the first decoding result. For example, the AP may transmit encrypted information of task information of the first decoding result to a service server of the first application indicated by the first identifier in the first decoding result, and may receive task information as a second decoding result of second type decoding from the service server.

In an example, the AP may perform operations 420, 430, and 440 in parallel.

In operation 450, the AP may display the second decoding result using the first application.

The electronic devices, AO sensor modules, APs, memories, cameras, processors, electronic device 100, AO sensor module 110, AP 120, memory 130, sensor 111, processor 112 described herein, including descriptions with respect to respect to FIGS. 1-4, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-4 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method with visual code processing, the method comprising:
generating a first image by capturing a first visual code, using an always on (AO) sensor module of an electronic device;
detecting a first code image included in the first image and corresponding to the first visual code, using the AO sensor module;
performing a first type decoding on the first code image, using the AO sensor module, wherein the first type decoding is a decoding performed by the AO sensor module;
in response to the first type decoding of the first code image failing, generating a second image by capturing the first visual code at a resolution greater than a resolution of the first image, using the AO sensor module, detecting a second code image included in the second image and corresponding to the first visual code, using the AO sensor module, and performing the first type decoding on the second code image, using the AO sensor module;
in response to the first type decoding of the second code image succeeding, waking up an application processor (AP) of the electronic device from a low-power state, based on a first decoding result of the first type decoding; and
executing a first application of the electronic device corresponding to the first visual code, using the AP.

2. The method of claim 1, further comprising:
generating a second decoding result by performing, using the AP, a second type decoding based on the first decoding result, wherein the second type decoding is a decoding performed by the AP; and
displaying the second decoding result using the first application.

3. The method of claim 2, further comprising:
unlocking the electronic device based on the first decoding result,
wherein the executing of the first application, the generating of the second decoding result, and the unlocking of the electronic device are performed in parallel.

4. The method of claim 2, wherein
the first decoding result comprises task information related to the first application, and
the generating of the second decoding result comprises:
transmitting the task information to a service server of the first application; and
receiving additional task information related to the first application as the second decoding result from the service server.

5. The method of claim 1, further comprising, in response to the first type decoding of the second code image failing, generating a third image by capturing the first visual code at a same resolution as the resolution of the first image, using the AO sensor module.

6. The method of claim 1, further comprising determining whether the first application is installed in the electronic device, based on the first decoding result, using the AO sensor module.

7. The method of claim 6, wherein
the first decoding result comprises a first identifier of the first application, and
the determining of whether the first application is installed in the electronic device comprises comparing the first identifier to an application list of the electronic device and determining whether the first application is installed in the electronic device.

8. The method of claim 6, further comprising, in response to a determination that the first application is not installed in the electronic device, capturing the first visual code or another visual code, using the AO sensor module.

9. A non-transitory computer-readable storage medium storing instructions that, when executed by one or more processors, configure the one or more processors to:
generate a first image by capturing a first visual code, using an always on (AO) sensor module of an electronic device;
detect a first code image included in the first image and corresponding to the first visual code, using the AO sensor module;
perform a first type decoding on the first code image, using the AO sensor module, including, wherein the first type decoding is a decoding performed by the AO sensor module;
in response to the first type decoding of the first code image failing, generate a second image by capturing the first visual code at a resolution greater than a resolution of the first image, using the AO sensor module, detect a second code image included in the second image and corresponding to the first visual code, using the AO sensor module, and perform the first type decoding on the second code image, using the AO sensor module; and
in response to the first type decoding of the second code image succeeding, wake up an application processor (AP) of the electronic device from a low-power state, based on a first decoding result of the first type decoding, and execute a first application of the electronic device corresponding to the first visual code, using the AP.

10. An electronic device comprising:
an always on (AO) sensor module configured to generate a first image by capturing a first visual code, detect a first code image included in the first image and corresponding to the first visual code, and perform a first type decoding on the first code image, wherein
the AO sensor module is further configured to, in response to the first type decoding of the first code image failing, generate a second image by capturing the first visual code at a resolution greater than a resolution of the first image, using the AO sensor module, detect a second code image included in the second image and corresponding to the first visual code, using the AO sensor module, and perform the first type decoding on the second code image, using the AO sensor module; and
an application processor (AP) that, in response to the first type decoding of the second code image succeeding, wakes up from a low-power state based on a first decoding result of the first type decoding and that is configured to execute a first application of the electronic device corresponding to the first visual code.

11. The electronic device of claim 10, wherein the AP is configured to:
generate a second decoding result by performing a second type decoding based on the first decoding result, wherein the second type decoding is a decoding performed by the AP; and
display the second decoding result using the first application.

12. The electronic device of claim 11, wherein
the AP is configured to unlock the electronic device based on the first decoding result, and
executing of the first application, generating of the second decoding result, and unlocking of the electronic device are performed in parallel.

13. The electronic device of claim 11, wherein
the first decoding result comprises task information related to the first application, and
for the generating of the second decoding result, the AP is configured to transmit the task information to a service server of the first application and receive additional task information related to the first application as the second decoding result from the service server.

14. The electronic device of claim 10, wherein, in response to the first type decoding of the second code image failing, the AO sensor module is configured to generate a third image by capturing the first visual code at a same resolution as the resolution of the first image.

15. The electronic device of claim 10, wherein the AO sensor module is configured to determine whether the first application is installed in the electronic device, based on the first decoding result.

16. The electronic device of claim 15, wherein
the first decoding result comprises a first identifier of the first application, and
for the determining of whether the first application is installed in the electronic device, the AO sensor module is configured to compare the first identifier to an application list of the electronic device and determine whether the first application is installed in the electronic device.

17. The electronic device of claim 15, wherein, in response to a determination that the first application is not installed in the electronic device, the AO sensor module is configured to capture the first visual code or another visual code.

18. An electronic device comprising:
an always on (AO) sensor module configured to perform:
a decoding based on a first image capturing a first visual code; and
another decoding based on a second image capturing the first visual code at a greater resolution than the first image, in response to determining a first code image is not recognized based on the decoding,
wherein the AO sensor module is further configured to, in response to the decoding of the first image failing, generate a second image by capturing the first visual code at a resolution greater than a resolution of the first image, using the AO sensor module, detect a second code image included in the second image and corresponding to the first visual code, using the AO sensor module, and perform the other decoding on the second code image, using the AO sensor module; and
an application processor (AP) configured to be woken up from a low-power state and execute a first application of the electronic device corresponding to the first visual code using the AP, based on either a result of the decoding, or a result of the other decoding in response to the other decoding of the second code image succeeding.

* * * * *